Dec. 5, 1944.   H. KOPLIN ET AL   2,364,300
HYDRAULIC CONTROL AND EJECTOR FOR GRINDERS
Filed Nov. 6, 1942   2 Sheets-Sheet 1
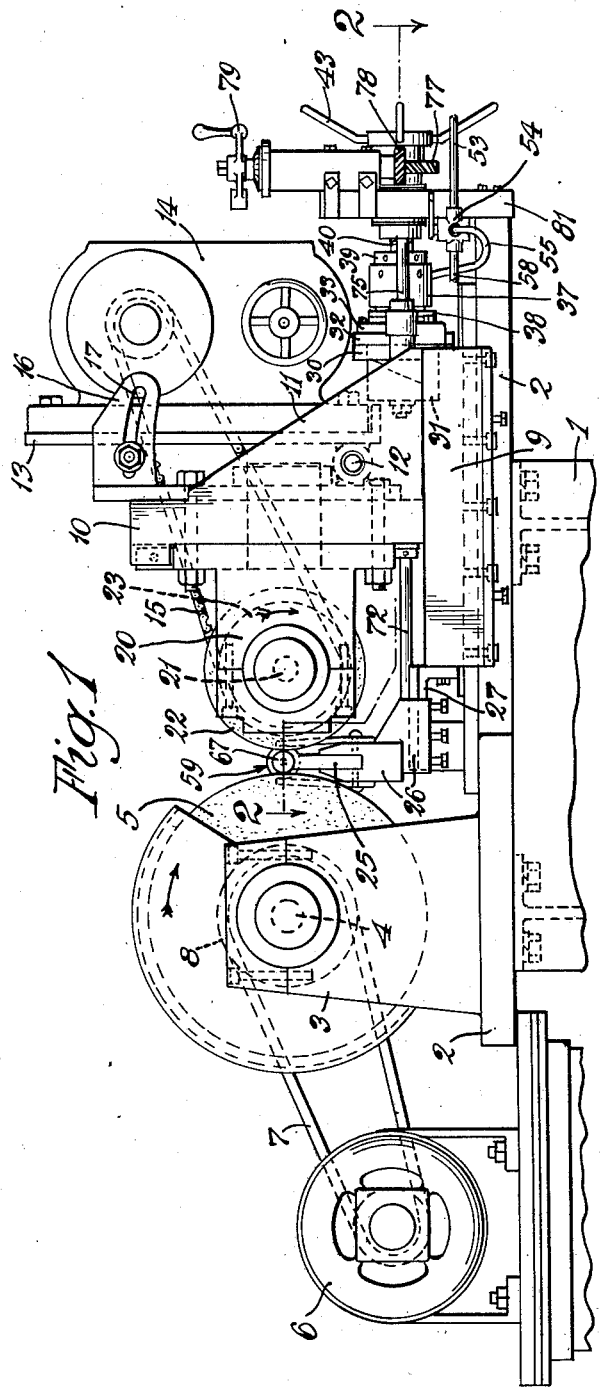
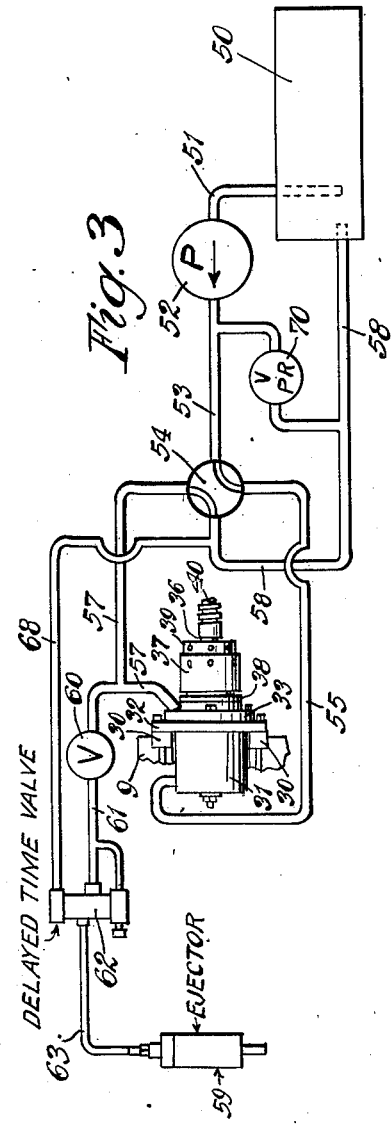
Inventors
Harry Koplin
Arthur R. Slate
by Parker & Carter
Attorneys.

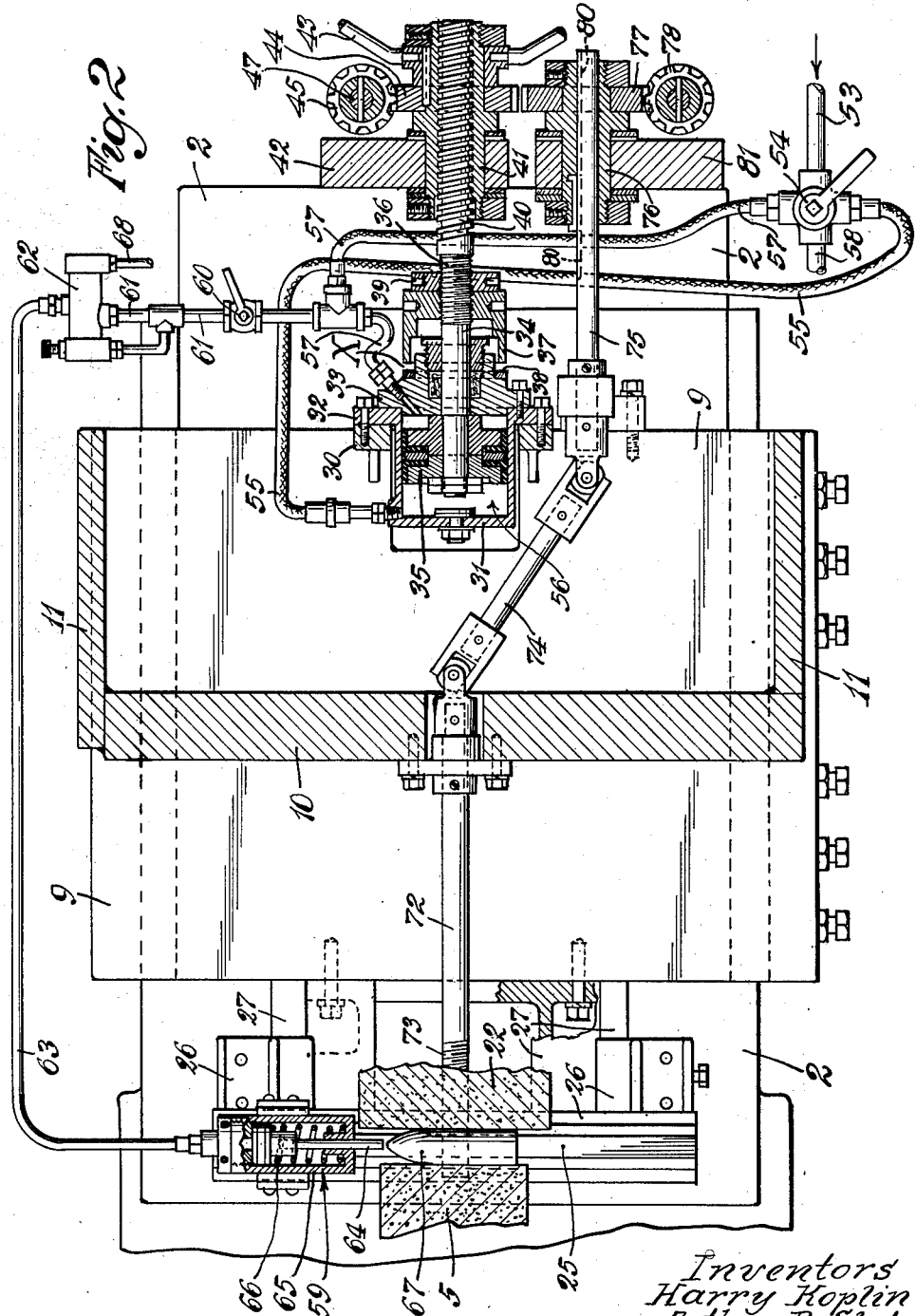

Patented Dec. 5, 1944

2,364,300

UNITED STATES PATENT OFFICE 2,364,300

HYDRAULIC CONTROL AND EJECTOR FOR GRINDERS

Harry Koplin and Arthur R. Slate, Chicago, Ill., assignors to Zephyr Laundry Machinery Company, Chicago, Ill., a corporation Application November 6, 1942, Serial No. 464,726

7 Claims. (Cl. 51—103)

Our invention relates to an improvement in grinders and the like. One useful application is to centerless grinders.

One purpose is the provision of improved means for moving one of two rotated tool members toward and away from the other.

Another purpose is the provision of improved hydraulic means for moving one of the members of the centerless grinder toward and away from each other.

Another purpose is the provision of improved means for moving the guide wheel of a centerless grinder toward and away from the grinding wheel.

Another purpose is the provision of improved ejecting means for grinders and the like, and for example for centerless grinders.

Other purposes will appear from time to time in the course of the specification and claims.

The invention is illustrated more or less diagrammatically in the accompanying drawings wherein:

Fig. 1 is an end elevation;

Fig. 2 is a section, on an enlarged scale on the line 2—2 of Fig. 1; and

Fig. 3 is a diagrammatic view of the pressure system employed.

Like parts are indicated by like symbols throughout the specification and drawings.

Referring to the drawings and for example to Fig. 1, 1 is any suitable sub-base or support structure, upon which may be mounted any suitable base 2. Extending upwardly from the base at one side thereof are supports 3, of which one appears in Fig. 1, the other being aligned directly with it. Rotatable in the supports 3, is any suitable shaft 4, upon which is mounted a grinding wheel 5, which rotates therewith. The grinding wheel is rotated in a clockwise direction, referring to the position of the parts in Fig. 1, by any suitable motor 6, belt or belts 7, and driven pulley 8.

Slidably mounted at the opposite side of the base 2 is a carriage structure generally indicated at 9, which includes an upwardly extending portion or plate 10, with rearwardly extending reinforcing webs 11. Pivoted as at 12 to the rear face of the plate 10 is a sub-base or platform 13, upon which is mounted any suitable gear reduction generally indicated as 14, and an associated motor not herein shown. It will be observed that the platform 13 may be adjusted about the pivot 12 to take up slack in the drive belt or chain 15. Ears 16, with arcuate slots 17, are provided for this purpose, rearwardly extending from the plate 10.

Mounted on the opposite or forward face of the plate 10 are supports 20, in which is trunnioned a shaft 21, which carries a guide or pressure wheel 22. 23 is a driven pulley or sprocket therefor, about which passes the belt 15. In the form of the device herein shown it will be understood that the axes of the shaft 21 and 4 are parallel and lie in a single horizontal plane.

Positioned between the wheels 5 and 22 is a work support including a work supporting blade 25 mounted on any suitable carriage 26, which is slidable along a slide or support 27 on the guide roll carriage 9. It will be understood that when the guide roll carriage 9 is moved toward and away from the grinding wheel, the work support normally moves unitarily with it. However, as will later appear, the work support may be moved in relation to the carriage 9.

It will be understood that in centerless grinders, the type of mechanism with which our invention is herein shown as employed, a grinding wheel such as 5 is rotated in opposition to a guide or pressure wheel, such as shown at 22. With the parts in the position shown in Fig. 1, both wheels may be rotated in the same direction of rotation. The result will be that the face of the grinding wheel 5 opposed to the work moves downwardly through the working throat defined by the two rotary members, and the opposed face of the pressure wheel 22 moves upwardly. The work to be ground may be positioned in the working throat between the two; the work being preferably so supported that its center of rotation is slightly above the centers of rotation of the opposed working wheels. If the axis of one of the wheels is tilted in relation to the other, a feeding movement through the working throat results. In the present embodiment of our invention, however, the axes of the two wheels are parallel, and no feeding movement of the work results from the rotation of the wheels. It will be understood that the grinding wheel 5 is rotated at a relatively high speed of rotation, many times the rate of rotation of the feed or pressure wheel 22.

In connection with the above described structure we provide means for quick release of the pressure wheel from the work at the end of the grinding operation, and associate with the quick release means ejector means for ejecting the work axially from the grinding throat after the pressure wheel has begun its backward movement.

Mounted on the moving platform or guide wheel base 9, for example on lugs 30, is a pressure cylinder 31, having a flange 32 screwed or otherwise secured to the lugs 30. Tightly secured to the flange 32 is the head or end closure 33, apertured to pass the piston shaft 34, which may pass through any suitable stuffing box. Positioned on the piston shaft is any suitable piston head 35. The piston shaft is provided with an exterior screw threaded portion 36, upon which is screw threaded a generally cylindrical stop element 37, the lip of which abuts against a hardened ring 38 on the exterior of the closure 33. 39 is any suitable locknut for locking the stop 37 in adjusted position. It will be observed, therefore, that the possible travel of the cylinder 31 in relation to the piston can be closely regulated, and in the position of the parts in Fig. 2 the available travel is indicated by the gap X.

The outer end of the piston shaft also is provided with a worm portion 40. It is threaded into a sleeve 41, rotatable in any suitable bearing support 42 on the base 2. The sleeve 41 may be operated by any suitable hand wheel 43, keyed thereto, or for fine adjustment through a gear 44, and pinion 45, which may be actuated by any suitable handle not herein shown for close adjustment, the handle being mounted on the shaft 47.

Referring now to the pressure system employed and shown diagrammatically in Fig. 3, 50 indicates any suitable fluid reservoir, from which the fluid is drawn along an outlet line 51 by any suitable pump 52. The pressure line 53 extends from the pump to any suitable two-way manual valve 54. When the valve 54 is in the position in which it is shown in Fig. 3, pressure flows along the line 55 into the space 56 of the cylinder 31, referring to the position of the parts shown in Fig. 2, and the carriage 9 moves toward the grind wheel 5. When the top 33 of the cylinder engages the opposed part of the piston 35, as shown in Fig. 2, further movement of the carriage 9 ceases, and if the adjustment is proper, the pressure wheel 22 is in contact with the work and urges it against the grind wheel 5, and the grinding operation begins.

When in the judgment of the operator the grinding operation has continued a sufficient time, he reverses the valve 54, and pressure then flows along the pressure line 57 to the opposite end of the cylinder 31 and to the opposite side of the piston. The result is a rapid return movement of the carriage through the allowed excursion, limited by the engagement of the stop 37 with the hardened ring 38.

It will be understood that one side of the two-way valve always provides a return of fluid to the reservoir along the line 58. When the line 57 is under pressure, the ejector 59 may also be operated. The hand valve 60 is provided in order to permit the ejector to be cut out if desired, but assume that the valve 60 is set in the open position, the pressure line 61 extends to a delayed time valve 62, which functions after the carriage 9 has begun, or preferably, completed its movement. By the action of the time valve the interior of the plunger line 63 is subjected to pressure, and any suitable plunger 64 in the cylinder 65 is moved against the spring 66, in such fashion that the plunger 64 engages the work 67 and kicks it out of the grinding throat. The ejector may be mounted, for example, upon the carriage 26.

Until the operator again reverses the valve 54, the ejector 64 remains in ejecting position. As soon as the valve 54 is reversed, however, pressure is relieved in the ejector cylinder and the delayed time valve, and liquid may return by the line 68, 58 to the reservoir 50.

It will be understood that the details of the delayed time valve do not of themselves form part of the present invention, and they are, therefore, not described or shown.

70 indicates any suitable pressure relief valve, it being understood that the pump is normally constantly operated. The valve 70, therefore, permits fluid to bypass the above described system.

The work support may be adjusted transversely of the working throat, for example by rotation of the rod 72, with its screw threaded portion 73, in mesh with the work support. 74 generally indicates any suitable universal connection to the actuating shaft 75, which may be rotated in any suitable manner, for example through the sleeve 76, keyed to the shaft 75 and carrying a gear 77 in mesh with a pinion 78, which may be rotated by any suitable handle 79. It will be understood that any suitable relative movement of the parts may be provided, for example by the keyway 80. The sleeve 76 is held against endwise movement but is rotatable in the support 81 on the base 2.

It will be realized that, whereas we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of our invention are as follows:

In the form of the device herein shown, work of a substantial range of diameters may be accommodated. In order to set the guide wheel 22 for the desired size of work, rotation of the hand wheel 43 will move the carriage 9 toward or away from the grind wheel 5 to obtain a rough adjustment. When this adjustment is taking place, the parts should be in the position in which they are shown in Figs. 2 and 3, with the pressure on the left side of the piston, referring to the position of the parts in which they are shown in Fig. 2. The finer adjustment may then be obtained by rotating the gear 44.

The adjustment can be gauged by the contact of the guide wheel 22 with any suitable gauge or with a finished piece of work positioned at the point shown at 67 in Fig. 2. Thereafter the device can be put into operation by reversing the valve 54 and thus causing a withdrawal of the carriage 9 and with it the wheel 22 to the opposite limit of their possible movement in relation to the grinder wheel 5. Work pieces may then be positioned manually, or in any other suitable manner upon the work support 25. The sloped surface will cause them to move gravitally against the surface of the pressure wheel 22. When the operator then rotates the valve 54, to feed the material forward, the pressure wheel 22 urges the work against the grind wheel 5, and the grind wheel grinds off the surface of the work. After a proper interval the operator again reverses the valve 54, and the result is an outward movement of the carriage 9, and the guide wheel 22 away from the grinding wheel 5. After the work has cleared the grind wheel, the ejector mechanism comes into play, and the ejector plunger 64 strikes the work and knocks it out of the grinding throat.

It will be understood that, although the work support 25 is shown as moving in unison with the carriage 9, this is unnecessary and is a mere matter of convenience. All that is essential is that some satisfactory means be provided for supporting the work in the grinding throat and preferably that the work be withdrawn entirely from the face of the grinding wheel before the ejector actuates.

We claim:

1. In combination, an opposed grinding wheel and guide wheel, a carriage upon which one of said wheels is mounted, hydraulic means for moving the carriage and the wheel on it toward and away from the opposed wheel, a work ejector, a hydraulic connection between said work ejector and said hydraulic means, and timing means for delaying the actuation of the ejector until after the carriage and wheel have moved away from the opposite wheel, including a delayed time valve in said hydraulic connection.

2. In combination, an opposed grinding wheel and guide wheel, a carriage upon which one of said wheels is mounted, hydraulic means for bodily moving the carriage and the wheel on it toward and away from the opposed wheel including a cylinder mounted on and moving with said carriage, and a piston in said cylinder and means for holding it in a predetermined position during hydraulic operation of the carriage, a work ejector, a hydraulic connection between said work ejector and said cylinder means, and manual control means for said hydraulic means, including a hydraulic reversing valve and an exterior handle therefor.

3. In combination, an opposed grinding wheel and guide wheel, a carriage upon which one of said wheels is mounted, hydraulic means for bodily moving the carriage and the wheel on it toward and away from the opposed wheel including a cylinder mounted on and moving with said carriage, and a piston in said cylinder and means for holding it in a predetermined position during hydraulic operation of the carriage, a work ejector, a hydraulic connection between said work ejector and said cylinder means, manual control means for said hydraulic means, including a hydraulic reversing valve and an exterior handle therefor, and timing means for delaying the actuation of the ejector until after the carriage and wheel have moved away from the opposite wheel.

4. In combination, an opposed grinding wheel and guide wheel, a carriage upon which one of said wheels is mounted, hydraulic means for bodily moving the carriage and the wheel on it toward and away from the opposed wheel including a cylinder mounted on and moving with said carriage, and a piston in said cylinder and means for holding it in a predetermined position during hydraulic operation of the carriage, a work ejector, a hydraulic connection between said work ejector and said cylinder means, and manual control means for said hydraulic means, including a hydraulic reversing valve and an exterior handle therefor, said hydraulic connection being effective only when the reversing valve has been set to withdraw the carriage from the opposed wheel.

5. In combination, in a hydraulic system for operating centerless grinders, a base, a grind wheel mounted for rotation on said base about a generally fixed axis of rotation, a guide wheel, a movable support for said guide wheel, said guide wheel being mounted for rotation on said support, means for limiting the approach of the guide wheel to the grind wheel, a work support in the throat between the two wheels, means for moving the guide wheel and its support toward and away from the grind wheel, including a cylinder and a piston therein, a source of hydraulic pressure, means for admitting the fluid under pressure from said source alternately to either side of the piston and for thereby imparting movement to said guide wheel and support toward and away from the grind wheel, an ejector plunger axially aligned with the work on the work support, a piston for said plunger and a plunger cylinder in which said piston moves, means for normally holding said plunger withdrawn in inoperative position and means, including a hydraulic connection between said source of hydraulic pressure and said plunger cylinder, for delivering fluid under pressure to said plunger piston, and for thereby advancing said plunger to work ejecting position, and means for timing the delivery of fluid to said plunger piston in relation to the withdrawal of the guide wheel from the grind wheel, including a delayed action valve.

6. In combination, in a centerless grinder having a fixed wheel, a movable wheel and a work rest in the throat between the two wheels, an ejector aligned with the work on the work rest and hydraulic means for operating the ejector and for moving the movable wheel toward and away from the fixed wheel including a source of fluid pressure, a wheel operating cylinder, a piston therein, an ejector operating cylinder and a piston therein, means for delivering a fluid under pressure from said source of fluid pressure alternatively to either side of the wheel operating piston and for thereby moving said movable wheel toward and away from the fixed wheel, and a connection between said source of fluid pressure and the operating side of the ejector piston, operative only when fluid pressure is being supplied to the wheel controlling cylinder during the movement of the movable wheel away from the fixed wheel, said connection with the ejector piston including a delayed time valve.

7. In a centerless grinder, a base, an opposed grinding wheel and a guiding wheel, a carriage movable on said base, on which one of said wheels is mounted, hydraulic means for moving said carriage and the wheel on it toward and away from the opposed wheel, including a cylinder mounted for movement with said carriage, a piston mounted on said base and located in said cylinder, a source of fluid, means for delivering fluid under pressure from said source selectively to either side of the piston, a work ejector and a fluid transmitting duct extending from one side only of said piston to said ejector, and a delayed time valve between said cylinder and said ejector.

H. KOPLIN.
ARTHUR R. SLATE.